United States Patent
Figueroa et al.

(10) Patent No.: US 10,432,724 B2
(45) Date of Patent: Oct. 1, 2019

(54) SERIALIZING ACCESS TO DATA OBJECTS IN A LOGICAL ENTITY GROUP IN A NETWORK STORAGE

(71) Applicant: INTERNATIONAL BUSINESS MACHINES CORPORATION, Armonk, NY (US)

(72) Inventors: Ernesto E. Figueroa, Sahuarita, AZ (US); Robert S. Gensler, Jr., Beavercreek, OH (US); Jeffrey R. Suarez, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 15/356,073

(22) Filed: Nov. 18, 2016

(65) Prior Publication Data

US 2018/0146037 A1 May 24, 2018

(51) Int. Cl.
*G06F 11/14* (2006.01)
*H04L 29/08* (2006.01)

(52) U.S. Cl.
CPC ...... *H04L 67/1097* (2013.01); *G06F 11/1464* (2013.01)

(58) Field of Classification Search
CPC ............. H04L 67/1097; G06F 11/1464; G06F 2201/84
See application file for complete search history.

(56) References Cited

U.S. PATENT DOCUMENTS

| | | |
|---|---|---|
| 6,721,902 B1 | 4/2004 | Cochran |
| 7,552,358 B1 | 6/2009 | Asgar-Deen et al. |
| 8,650,159 B1 | 2/2014 | Zhang et al. |
| 8,769,224 B1 | 7/2014 | Raj et al. |
| 2003/0037061 A1 | 2/2003 | Sastri et al. |
| 2004/0133540 A1 | 7/2004 | Saake et al. |
| 2004/0255048 A1 | 12/2004 | Lev Ran et al. |
| 2007/0250674 A1 | 10/2007 | Fineberg et al. |
| 2008/0301141 A1* | 12/2008 | Banjou ............... G06Q 10/10 |
| 2010/0100587 A1 | 4/2010 | Teglovic et al. |
| 2011/0029739 A1 | 2/2011 | Nakajima et al. |

(Continued)

OTHER PUBLICATIONS

Office Action dated Oct. 30, 2018, pp. 28, for U.S. Appl. No. 15/356,147.

(Continued)

*Primary Examiner* — Wing F Chan
*Assistant Examiner* — Billy H Ng
(74) *Attorney, Agent, or Firm* — David W. Victor; Konrad Raynes Davda & Victor LLP

(57) ABSTRACT

Provided are a computer program product, system, and method for serializing access to data objects in a logical entity group in a network storage. Data objects associated with a logical entity at a client storage are generated. A determination is made of a prefix for a container in the network storage associated with the logical entity. The prefix is included in names of the data objects in the logical entity. The prefix is added to a lock queue shared by the client systems having access to the data objects in the container at the network storage. The data objects having the names including the prefix are transmitted to the network storage to store in the container in the network storage.

22 Claims, 9 Drawing Sheets

(56) References Cited

U.S. PATENT DOCUMENTS

| | | |
|---|---|---|
| 2011/0252071 A1 | 10/2011 | Cidon |
| 2012/0017037 A1 | 1/2012 | Riddle et al. |
| 2013/0110784 A1 | 5/2013 | Guo et al. |
| 2013/0185258 A1 | 7/2013 | Bestler et al. |
| 2014/0181034 A1 | 6/2014 | Harrison et al. |
| 2014/0181051 A1 | 6/2014 | Montulli et al. |
| 2014/0181579 A1 | 6/2014 | Whitehead et al. |
| 2015/0269032 A1* | 9/2015 | Muthyala ............ G06F 11/1464 707/639 |
| 2016/0004718 A1 | 1/2016 | Lin et al. |
| 2016/0154817 A1 | 6/2016 | Mason, Jr. et al. |
| 2016/0210308 A1 | 7/2016 | Shekhar et al. |
| 2016/0364158 A1 | 12/2016 | Narayanan et al. |
| 2017/0123935 A1* | 5/2017 | Pandit ................. G06F 11/1451 |
| 2017/0277602 A1 | 9/2017 | Kumar et al. |

OTHER PUBLICATIONS

U.S. Appl. No. 15/015,598, filed Feb. 4, 2016.
"DFSMSdss Storage Administration", IBM Corporation, Version 2 Release 1, Document SC23-6868-01, 2014, pp. 710.
"tar—Format of tar archives", IBM Corporation, [online][retrieved Nov. 5, 2016] https://www.ibm.com/support/knowledgecenter/SSLTBW_2.2.0/com.ib . . . , pp. 3.
"tar (computing)", Wikipedia, [online][retrieved Nov. 5, 2016] https://en.wikipedia.org/wiki/Tar_(computing), pp. 9.
"The TAR File Format", FileFormat.Info, [online][retrieved Nov. 5, 2016] http://www.fileformat.info/format/tar/corion.htm, pp. 8.
"XML API Overview—Cloud Storage Documentation", Google.Com, [online][retrieved Nov. 5, 2016] https://cloud.google.com/storage/docs/xml-api/overview, pp. 7.
"Multi-Cloud Storage Toolkit", IBM Corporation, [online][retrieved Nov. 5, 2016] https://www.zurich.ibm.com/csc/security/toolkit/, pp. 2.
U.S. Appl. No. 15/356,147, filed Nov. 18, 2016.
"DFSMSdss Storage Administration", IBM Corporation, Version 2 Release 1, Document SC23-6868-01, 2014, Chapter 6. Managing availability with DFSMSdss, pp. 37-42; Chapter 13. Format of the DFSMSdss dump data set, pp. 195-214.
List of Patents or Patent Applications Treated as Related, dated Nov. 18, 2016, pp. 2.
U.S. Appl. No. 16/352,817, filed Mar. 13, 2019.
Response dated Jan. 30, 2019, pp. 14, to Office Action1 dated Oct. 30, 2018, pp. 28, for U.S. Appl. No. 15/356,147.
Final Office Action dated Mar. 20, 2019, pp. 29, for U.S. Appl. No. 15/356,147.
List of IBM Patents or Patent Applications Treated as Related, dated Mar. 25, 2019, pp. 2.

* cited by examiner

Logical Entity Group

Data Object Name

Lock Request

Lock Entry

SERIALIZING ACCESS TO DATA OBJECTS IN A LOGICAL ENTITY GROUP IN A NETWORK STORAGE

BACKGROUND OF THE INVENTION

1. Field of the Invention

The present invention relates to a computer program product, system, and method for serializing access to data objects in a logical entity group in a network storage.

2. Description of the Related Art

Cloud storage service providers provide access to network based storage to allow subscribers to backup and access data objects in containers and locations in the network storages over a network, such as the Internet. When an object is stored in the cloud, multiple copies of an object may be created. Cloud storage services may partition the cloud storage so that subscribers are limited to accessing those partitions or containers of storage to which they are assigned.

Client systems may use Hypertext Transport Protocol (HTTP) type commands to access data objects stored in cloud storage, such as GET and PUT requests.

There is a need in the art for improved techniques for providing access to data objects stored in a network storage accessible to multiple client systems, such as cloud storage services.

SUMMARY

Provided are a computer program product, system, and method for serializing access to data objects in a logical entity group in a network storage. Data objects associated with a logical entity at a client storage are generated. A determination is made of a prefix for a container in the network storage associated with the logical entity. The prefix is included in names of the data objects in the logical entity. The prefix is added to a lock queue shared by the client systems having access to the data objects in the container at the network storage. The data objects having the names including the prefix are transmitted to the network storage to store in the container in the network storage.

DETAILED DESCRIPTION

Described embodiments provide techniques to serialize access to data objects stored in a network storage, such as a cloud storage, that will be used when storing and retrieving backups contained within objects in cloud storage. Described embodiments prevent multiple writers from storing the same object that compromises the integrity of the backup. It will also prevent concurrent readers and writers to prevent an object from being read (retrieved) if the object is still in the process of being written/stored. This mechanism will allow multiple readers of an object, meaning once the object has been stored, multiple users could retrieve the object concurrently.

Described embodiments may be deployed in backup environments to backup objects to prevent a user creating a backup from overlaying a backup object that contains parts of a backup and to prevent a user from restoring a backup object being written. Described embodiments provide for serialization using a prefix based on a container name storing data objects associated with a logical entity. A write lock held for a prefix may prevent client systems and applications from accessing any data objects associated with a logical entity when a write lock is held for the prefix. When no write lock is held for a prefix, such as only read locks granted, multiple applications and client systems may read access any of the data objects in the container associated with the prefix for which read locks are held.

Figure 1:
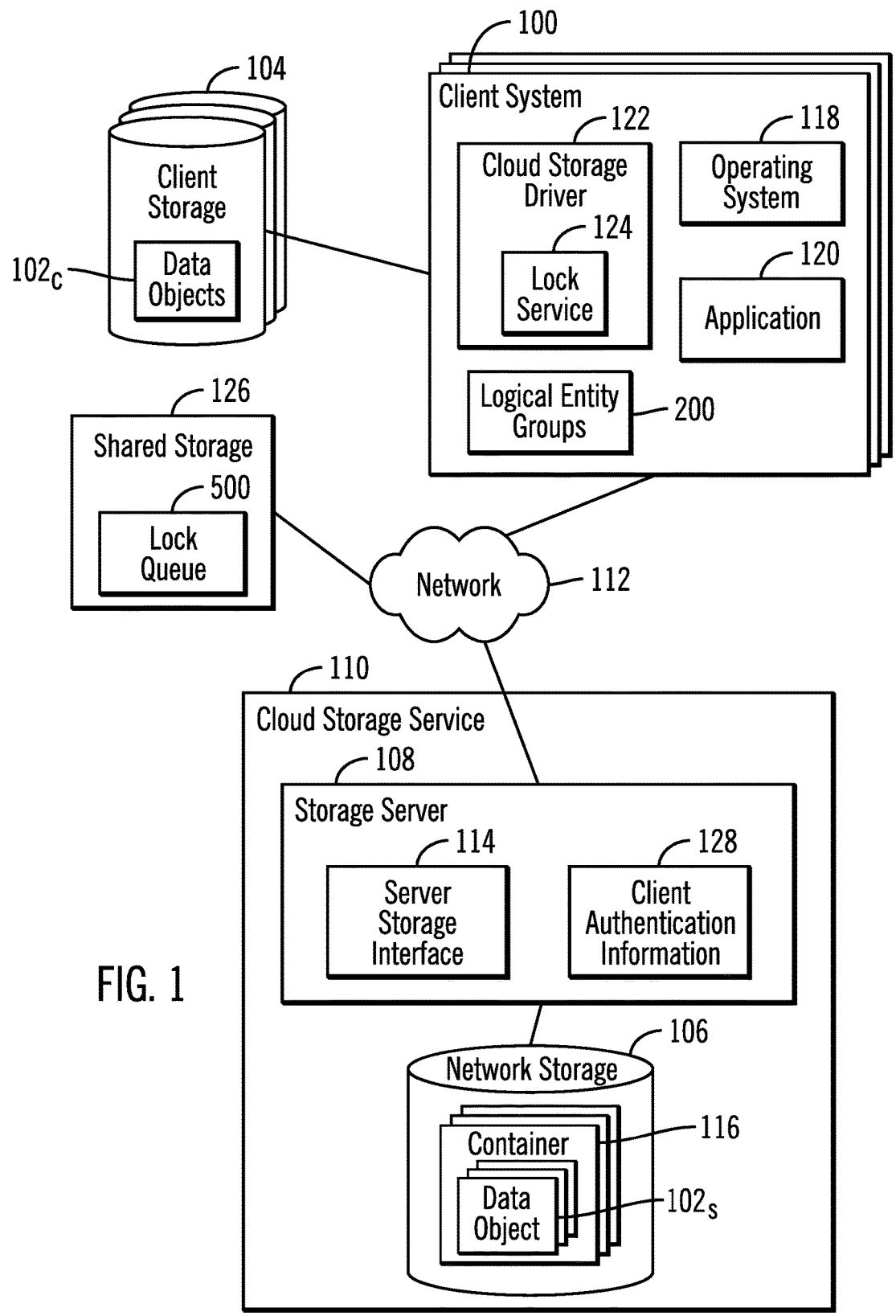
FIG. 1 illustrates an embodiment of a network storage environment.

FIG. 1 illustrates an embodiment of a network storage environment comprising client systems 100, also referred to as a client system, that may store client side data objects 102$_C$ in a client storage 104 in a network storage 106 managed by a storage server 108 part of a cloud storage service 110 available over a network 112. The cloud storage service 110 provides networks storage services to allow participating clients that subscribe to the storage services offered by the cloud storage service 110 to store data objects 102$_C$ over the network 112 at the network storage 106.

The storage server 108 may include a server storage interface 114 to process access requests with respect to received client data objects 102$_C$ to store and server data objects 102$_S$ stored in containers 116 configured in the network storage 106 for subscribers to the cloud storage service 110. The data objects 102$_S$ in a container 116 may comprise client data objects 102$_C$ provided by one or more client systems 100 or different applications 118 in one or more client systems 100. The storage server 108 maintains client authentication information 128 to determine whether the client systems 100 and/or applications 120 requesting access to containers 116 in the network storage 106 are subscribers authorized to access specified containers 116 and requested data objects 102$_S$. Each client system 100 may interface with multiple different cloud storage services 110 offered by different cloud storage service providers, such as DropBox®, Google® Drive, Amazon Cloud Drive®, Amazon® S3, IBM® Cloud Object Storage System™, etc. (Dropbox is a registered trademark of Dropbox, Inc., Google is a registered trademark of Google, Inc., Amazon and Amazon Cloud Drive are trademarks of Amazon Technologies, Inc.; and IBM and Cloud Object Storage System are trademarks of IBM throughout the world).

The client 100 may include an operating system 118 that manages computer hardware and software resources and provides common services and a file system for the storage 104. The application program 120 may invoke a cloud storage driver 122, which may be supplied by the cloud storage service provider, to read and write data objects to the network storage 106. The application program 120 may organize the data objects $102_C$ in logical entity groups 200. The data objects $102_C$ for each logical entity group $200_i$ may be stored in a container 116 in the network storage 106 associated with the logical entity group. For instance, in one embodiment, the application 120 may comprise a backup program and a logical entity group $200_i$ may comprise a backup object group that organizes the data objects $102_C$ for a storage unit, e.g., volume, subject to backup. The backup application 120 stores and accesses backup objects for a backup object group stored in the container 116.

In one embodiment, the cloud storage driver 122 may transmit to the storage server interface 114 PUT commands to transmit client data objects $102_C$ to a storage server interface 114 and GET commands to retrieve data objects $102_S$ in the network storage 106. In one embodiment, the PUT and GET commands may be part of a network protocol, such as the Hypertext Transport Protocol (HTTP). In additional embodiments, different commands and protocols may be used for the transfer. Further, the transmitting of the blocks of data objects from the client system 100 to the storage server 108 with the PUT and GET commands may be transferred using a block level storage transfer.

The cloud storage driver 122 may maintain a lock service 124 to manage locks to the data objects $102_S$ assigned to a logical entity group $200_i$ to maintain consistency in a when there are multiple data objects 102 for a logical entity 200 being accessed by different clients 100 and applications 120. The lock service 124 in multiple clients 100 may access a lock queue 500 having lock entries that indicate a lock held for a prefix associated with a container 116 having data objects $102_S$ being accessed by the applications 120.

The lock queue 500 may be maintained in a shared storage 126. The shared storage 126 may comprise a network or other storage accessible to the client systems 100 over the network 112. In alternative embodiments, the shared storage 126 may be implemented in a client storage 104 that is accessible to multiple of the client systems 100. Alternatively, the lock queue 500 may be maintained in the container 116 on the network storage 106, and accessible to those clients 100 authorized to access the data objects in the container 116.

The client storage 104, shared storage 126, and the network storage 106 may be comprised of one or more storage devices known in the art, such as interconnected storage devices, where the storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The storage devices in one storage tier maybe organized as a Redundant Array of Independent Disks (RAID) array, a Just of Bunch of Disks (JBOD) array, and other arrangements.

The network 112 may comprise a network such as a Storage Area Network (SAN), Local Area Network (LAN), Intranet, the Internet, Wide Area Network (WAN), peer-to-peer network, wireless network, arbitrated loop network, etc. In one embodiment, the storage server 108 may implement a cloud computing environment in the network 112 that provides storage services to clients 100 that subscribe to the cloud storage service.

Although a certain number of instances of elements, such as clients 100, storage servers 108, and storages 104 and 106, etc., are shown, there may be any number of these elements.

Figure 2:
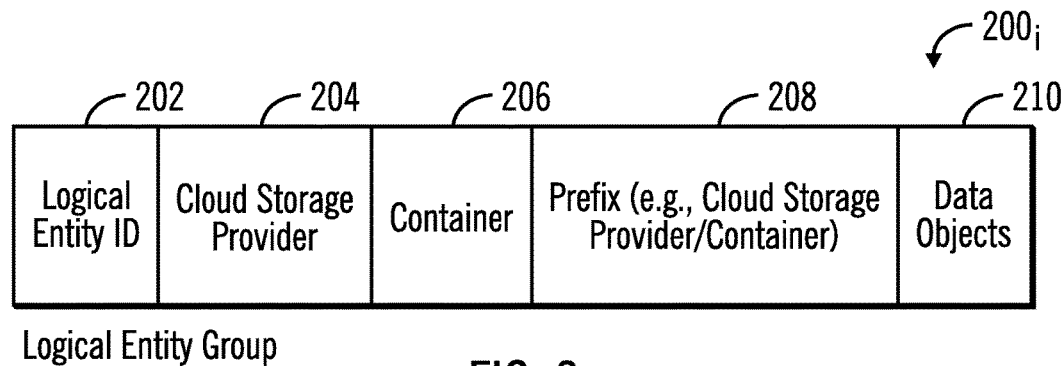
FIG. 2 illustrates an embodiment of a logical entity group.

FIG. 2 illustrates an embodiment of an instance of a logical entity group $200_i$, where a client 100 may define multiple logical entity groups in which data objects $102_C$ at the client may be grouped and associated. A logical entity group $200_i$ may include a logical entity group identifier (ID) 202; a cloud storage provider 204 providing cloud storage services at a network storage 106 to store elements from the logical entity 202; a container 206 in the network storage 106 in which data objects $102_C$ assigned to the logical entity 202 will be stored; a prefix 208 associated with the logical entity group 202, which may be based on a concatenation or derivation, e.g., hash, of the cloud storage provider 204 and the container 206 names; and names of data objects 210 assigned/associated with the logical entity 202.

Figure 3:
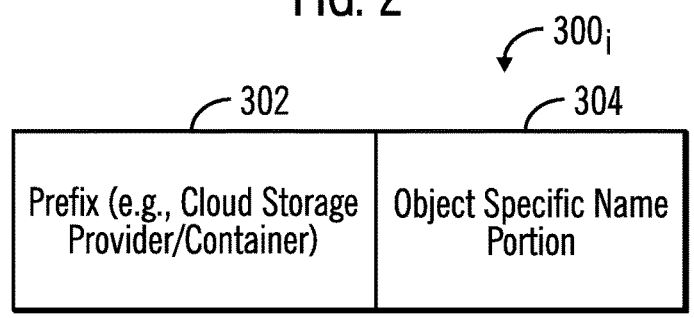
FIG. 3 illustrates an embodiment of a data object name.

FIG. 3 illustrates an embodiment of a data object name $300_i$ of a data object $102_C$, $102_S$ including a prefix 302, which may comprise a concatenation or derivation (e.g., hash) of the identifier/name of a cloud storage provider, providing the network storage 106 at which the data object having the name $300_i$ is stored, and a name of the container 116 in the network storage 106 in which the data object $102_C$ having the name $300_i$ is stored; and an object specific name portion 304 that is unique to the named data object $102_C$, $102_S$.

Figure 4:
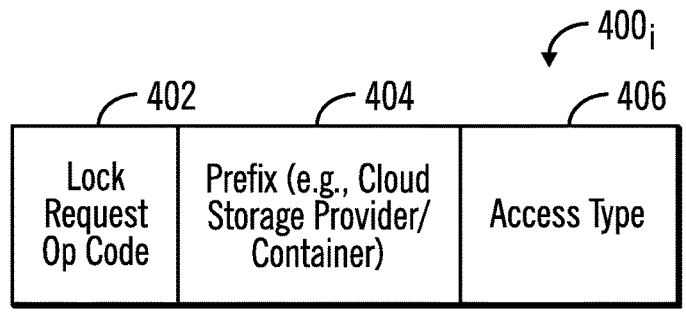
FIG. 4 illustrates an embodiment of a lock request.

FIG. 4 illustrates an instance of a lock request $400_i$ to access a data object in a container 116 in a network storage 106 to provide a lock across all the data objects $102_S$ for all the clients 100 in a container 116. The lock request $400_i$ may include a lock request operation code 402; a prefix 404, e.g., concatenation/derivation of the cloud storage provider name and container name; and an access type 406, such as read (shared) or write (exclusive).

Figure 5:
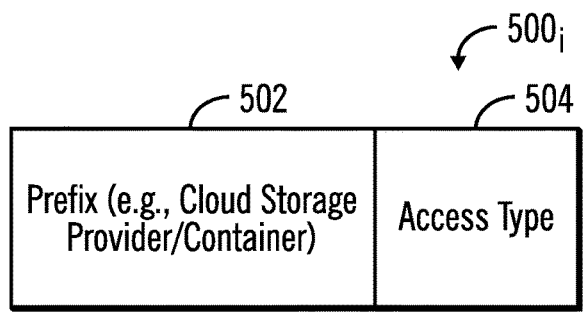
FIG. 5 illustrates an embodiment of a lock entry in a lock queue.

FIG. 5 illustrates an embodiment of a an instance of a lock entry $500_i$ in the container lock queue 500, and includes a prefix 502, e.g., a concatenation/derivation of the cloud storage provider name/identifier and the container 116 name, and an access type 504, such as read (shared) or write (exclusive). The lock $500_i$ controls access across all data objects $102_S$ assigned to a container 116, identified by a prefix 502, to provide consistent access to the data objects $102_S$ in a logical entity group, so as to prevent one client/application from writing to a data object $102_S$ while another client/application is reading from the object.

Figure 6:
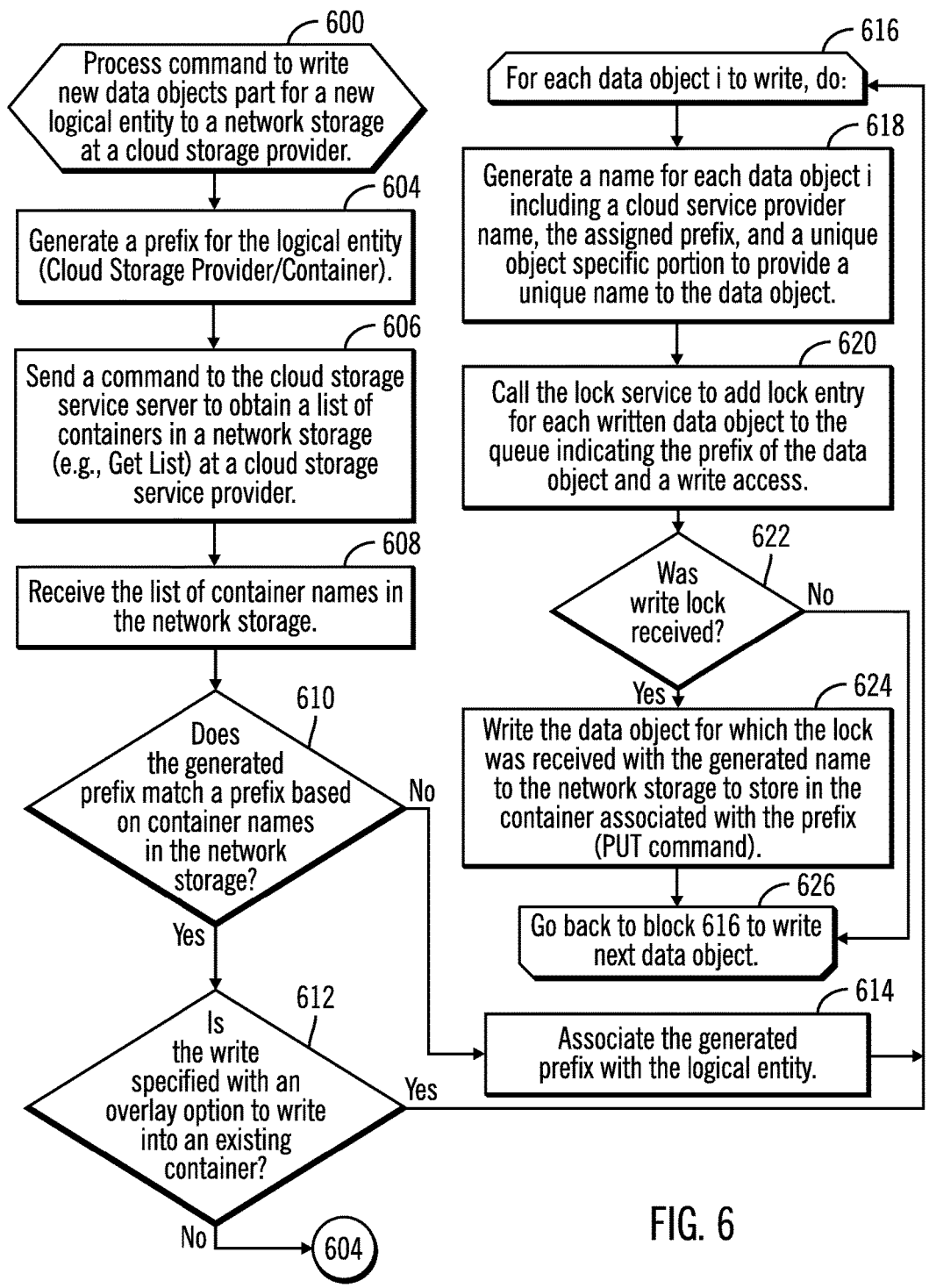
FIG. 6 illustrates an embodiment of operations to write new data objects to a network storage.

FIG. 6 illustrates an embodiment of operations performed by the cloud storage driver 122 to process a command from the application 120 to write new client data objects $102_C$ for a new logical entity $200_i$ with which the data objects $102_C$ to write are associated. Upon processing (at block 600) a command to write one or more client data objects $102_C$ to the network storage 106, the cloud storage driver 122 generates (at block 604) a prefix 208, which may comprise the cloud storage provider name 204 and a new container name 206 for the data objects of the logical entity group $200_i$. A command is sent (at block 606) to the cloud storage service server 108 to obtain a list of containers 116 configured in the network storage 106 at the cloud storage service 110 that the user of the transmitting client system 100 is authorized to access according to the client authentication information 128. Upon receiving (at block 608) the list of container 116 names, if (at block 610) the generated prefix 208 matches a container name in the returned list, then a determination is made (at block 612) whether the write or container 116 is specified with an overlay option to write to an existing container. If (at block 612) the overlay option is not specified, then control returns to block 604 to regenerate a new prefix 208 to try to use, such as try a new container name 206 portion to combine with the cloud storage provider 204 name.

If (from the no branch of block 610) the generated prefix is not currently being used, then the generated prefix and the container name used in the prefix is saved (at block 614) in fields 208 and 206 for the logical entity group $200_i$.

From block 614 or from the yes branch of block 612 if the object is to be overlaid, the cloud storage driver 122 generates (at block 616) a name $300_i$ for the data object $102_i$ to store including a prefix 302, comprising the prefix 208 for the logical entity group $200_i$, and a unique object specific portion 306 to provide a unique name to the data object. The cloud storage driver 122 calls (at block 620) the lock service 124 to add a write lock entry $500_i$ for the data object $102_i$ to the lock queue 500 indicating the prefix 502 of the data object $102_i$ and a write access type 504. If (at block 622) the write lock $500_i$ was received, then the cloud storage driver 122 writes (at block 624) the data object $102_C$ with the generated name $300_i$ to the network storage 106 to store in the container 206 associated with the prefix 208. If (at block 622) the write lock $500_i$ is not received, then the cloud storage driver 122 may continue to try to write other data objects $102_C$ while waiting for a write lock that is not currently available.

Figure 7:
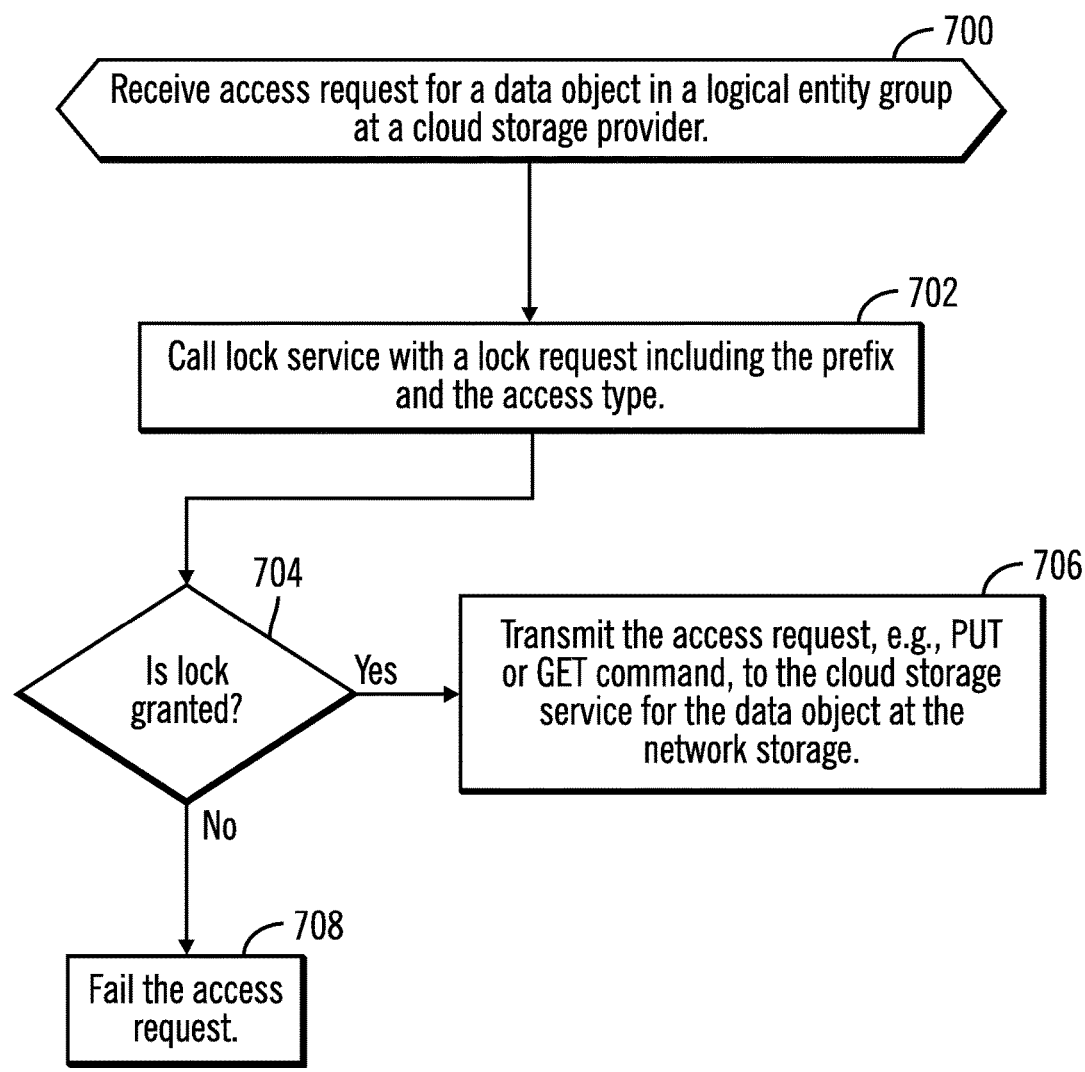
FIG. 7 illustrates an embodiment of operations to process an access request to a data object at a network storage.

FIG. 7 illustrates an embodiment of operations performed by the cloud storage driver 122 to process a request for a data object $102_S$ from the application 120. Upon receiving (at block 700) the request to access, a read to an existing data object $102_S$ or a write to a new or existing data object $102_C$ for an existing logical entity group $200_i$, the cloud storage driver 122 calls the lock service 124 with a lock request $400_i$ including the prefix 208 for the logical entity group $200_i$ with which the data object $102_S$ is associated in field 404 and the access type 406, e.g., read or write. If (at block 704) the lock service 124 determines the lock is granted, then the cloud storage driver 122 transmits (at block 706) over the network 112 an access request, e.g., PUT or GET command, to the cloud storage service 110 for the data object $102_S$ at the network storage 106. If (at block 704) the lock is not granted, then the access request is failed (708). In alternative embodiments, the access request may be tried a predetermined number of times before failing.

Figure 8:
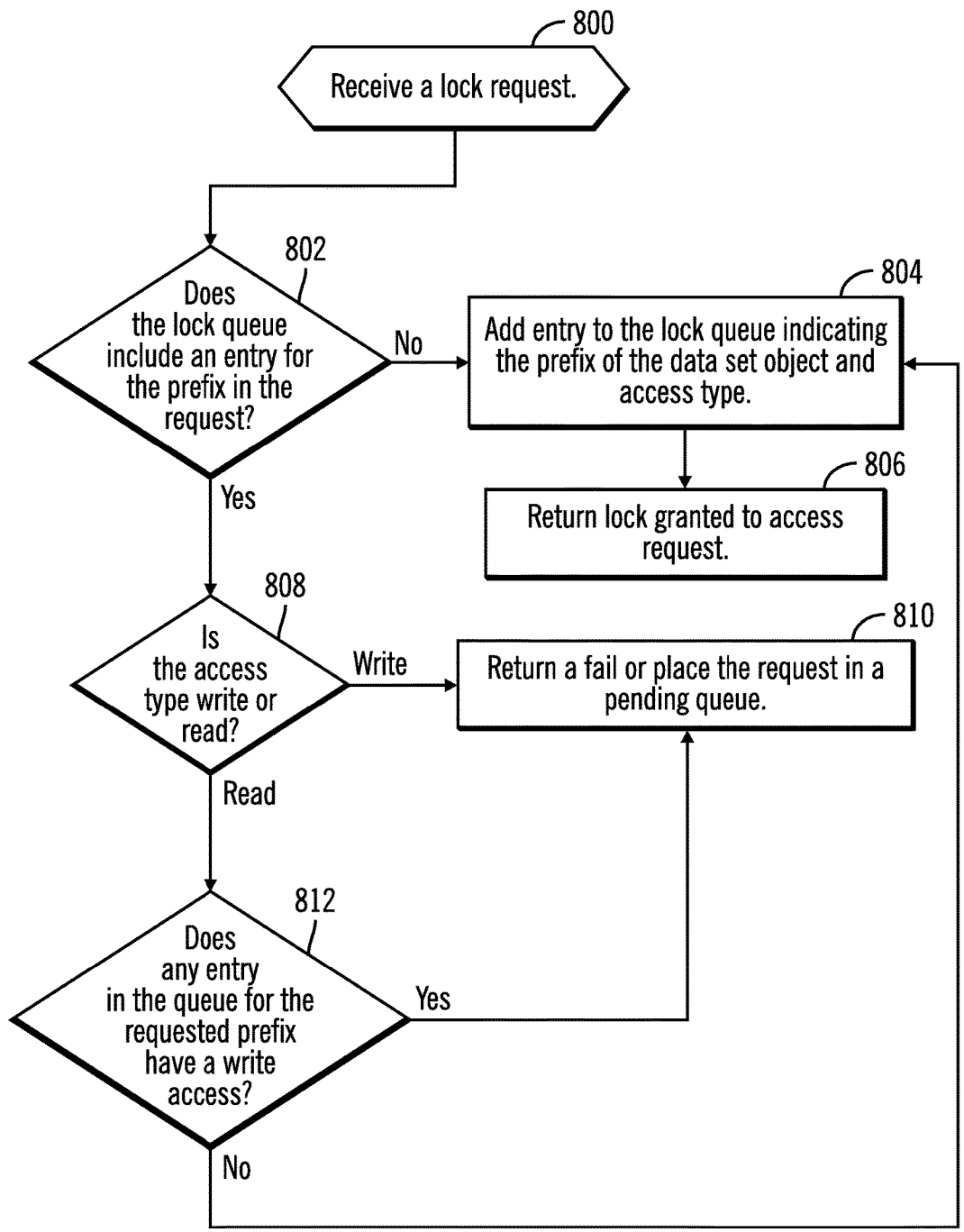
FIG. 8 illustrates an embodiment of operations to process a lock request at a client system.

FIG. 8 illustrates an embodiment of operations performed by the lock service 124 to process a lock request $400_i$ from a cloud storage driver 122. Upon receiving (at block 800) a lock request $400_i$, if (at block 802) the lock queue 500 does not include an entry $500_i$ having a prefix 502 matching the prefix 404 in the request, then the lock service 124 adds (at block 804) a lock entry $500_i$ to the lock queue 500 indicating the prefix 404 in field 502 and indicates the access type 504 as the access type 406 in the lock request $400_i$. A granted lock is returned (at block 806) to the received lock request $400_i$. If (at block 802) the lock queue 500 includes an entry $500_i$ having a prefix 502 matching the prefix 404 in the lock request $400_i$, then a determination is made (at block 808) whether the access type 406 in the request $400_i$ is a write. If so, then fail is returned (at block 810) or, alternatively, the request $400_i$ is placed in a pending queue to retry after the pending write completes. If (at block 808) the access type 406 of the lock request $400_i$ is a read, and if (at block 812) there is one entry $500_i$ in the lock queue 500 with the prefix 502 in the prefix field 404 of the request $400_i$ for a write access type 504, then control proceeds to block 810 to fail or queue the lock request $400_i$. If (at block 812) there is no entry $500_i$ in the queue with the requested prefix 404 that is a write access, then control proceeds to block 804 to grant the lock request.

With the operations of FIG. 8, if one application 118 has a write lock to one of the data objects $102_S$ in a container 116, then the lock entry $500_i$ for a prefix 502 is used to prevent any other application 120, process or client system 100 from accessing any other object in that container 116 associated with that write locked prefix 502. This provides consistency among all the data objects $102_S$ in a container 116 that are part of a logical entity group $200_i$ by preventing one object from being read by one process while another object is being written. Further, with the operations of FIG. 8, applications 120 in one or more clients 100 may concurrently read different data objects $102_S$ in a container 116.

Figure 9:
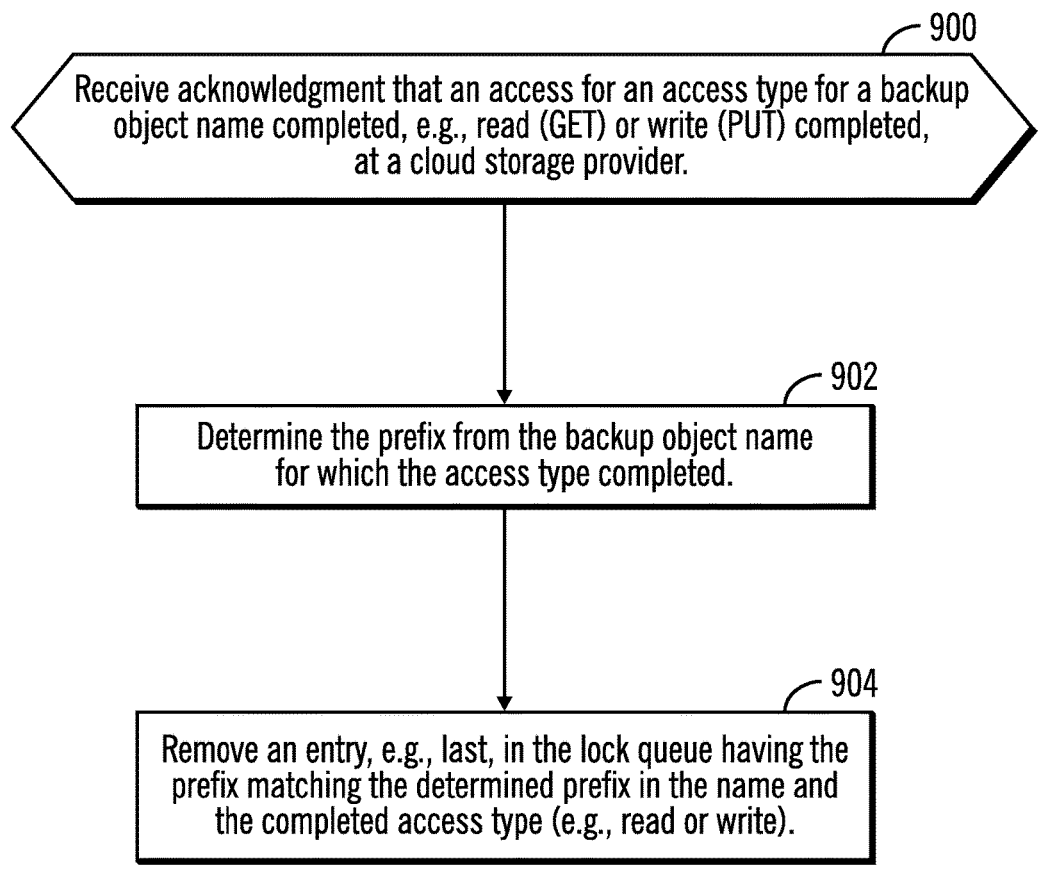
FIG. 9 illustrates an embodiment of operations to process an acknowledgment that an access request completed.

FIG. 9 illustrates an embodiment of operations performed by the cloud storage driver 122 to process an acknowledgment that an access to a data object $102_S$ in a container 116 completed access, where the acknowledgment may comprise returned read data, such as in response to a GET request, or an acknowledgment that a write completed in response to a write (PUT request). Upon receiving (at block 900) the acknowledgment of read or write complete, the cloud storage driver 122 determines (at block 902) the prefix 302 from the name $300_i$ of the data object for which access completed, and removes (at block 904) an entry $500_i$ in the lock queue 500 having the prefix 502 matching that determined prefix 302 in the name $300_i$ and the completed access type 504, e.g., read or write. If a write completed, then the cloud storage driver 122 may process any queued read or writes for the prefix waiting in a pending queue.

With the described embodiments of FIG. 9, upon completing an access for a container, the lock entry $500_i$ having a prefix 502 and access type 504 matching that of the completed access request is removed. If an entry for a write lock $500_i$ is removed, then applications 120 may continue to access all the data objects in the container 116 associated with the prefix whose write lock entry $500_i$ was removed.

Cloud Computing Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
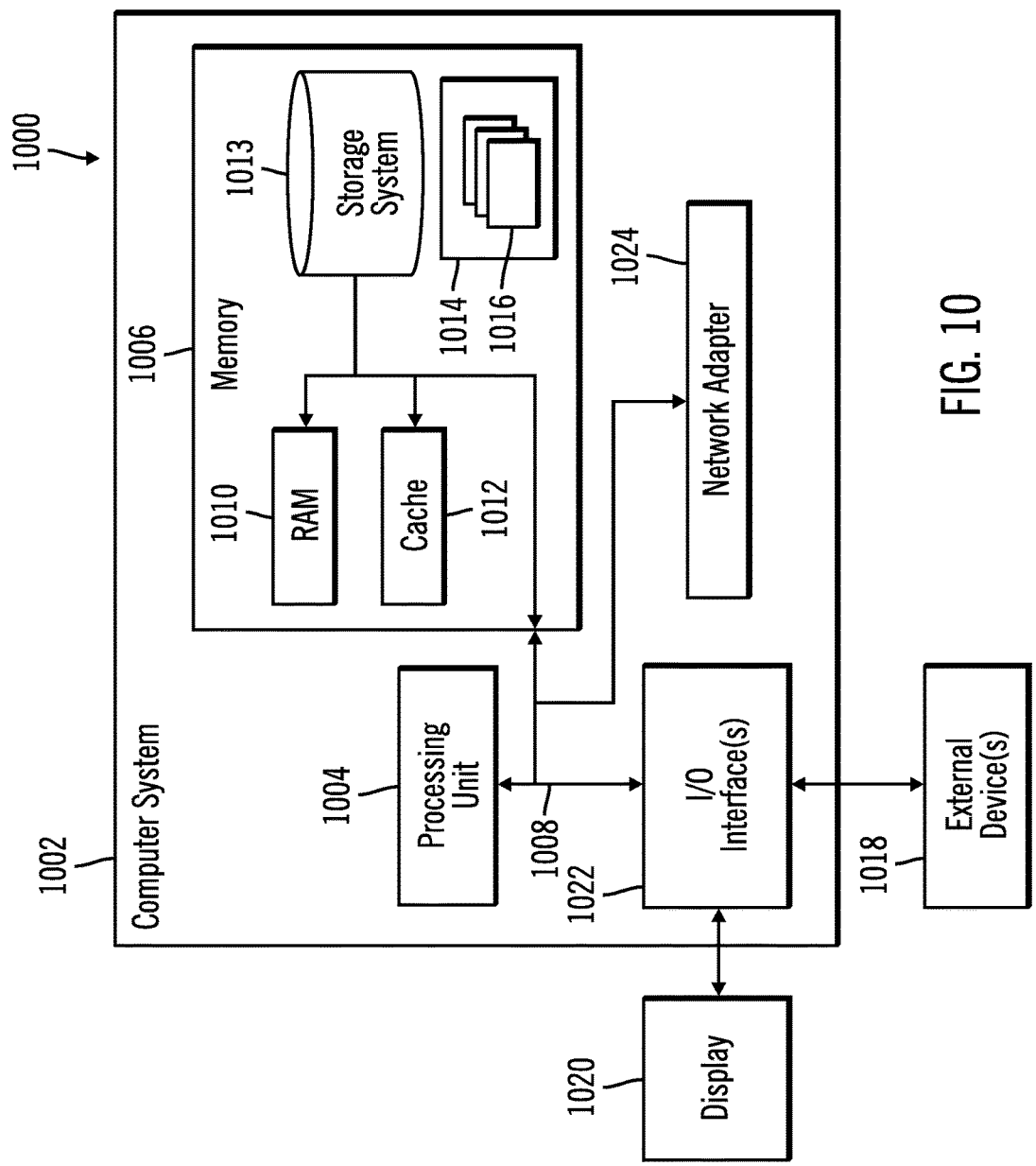
FIG. 10 depicts an embodiment of a cloud computing node.

Referring now to FIG. 10, a schematic of an example of a cloud computing node is shown, such as the client systems 100 and storage server 108, that implement a cloud based storage service. Cloud computing node 1000 is only one example of a suitable cloud computing node and is not intended to suggest any limitation as to the scope of use or functionality of embodiments of the invention described herein. Regardless, cloud computing node 1000 is capable of being implemented and/or performing any of the functionality set forth hereinabove.

In cloud computing node 1000 there is a computer system/server 1002, which is operational with numerous other general purpose or special purpose computing system environments or configurations. Examples of well-known computing systems, environments, and/or configurations that may be suitable for use with computer system/server 1002 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1002 in cloud computing node 1000 is shown in the form of a general-purpose computing device. The components of computer system/server 1002 may include, but are not limited to, one or more processors or processing units 1004, a system memory 1006, and a bus 1008 that couples various system components including system memory 1006 to processor 1004.

Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1016 generally carry out the functions and/or methodologies of embodiments of the invention as described herein.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 20. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

Figure 11:
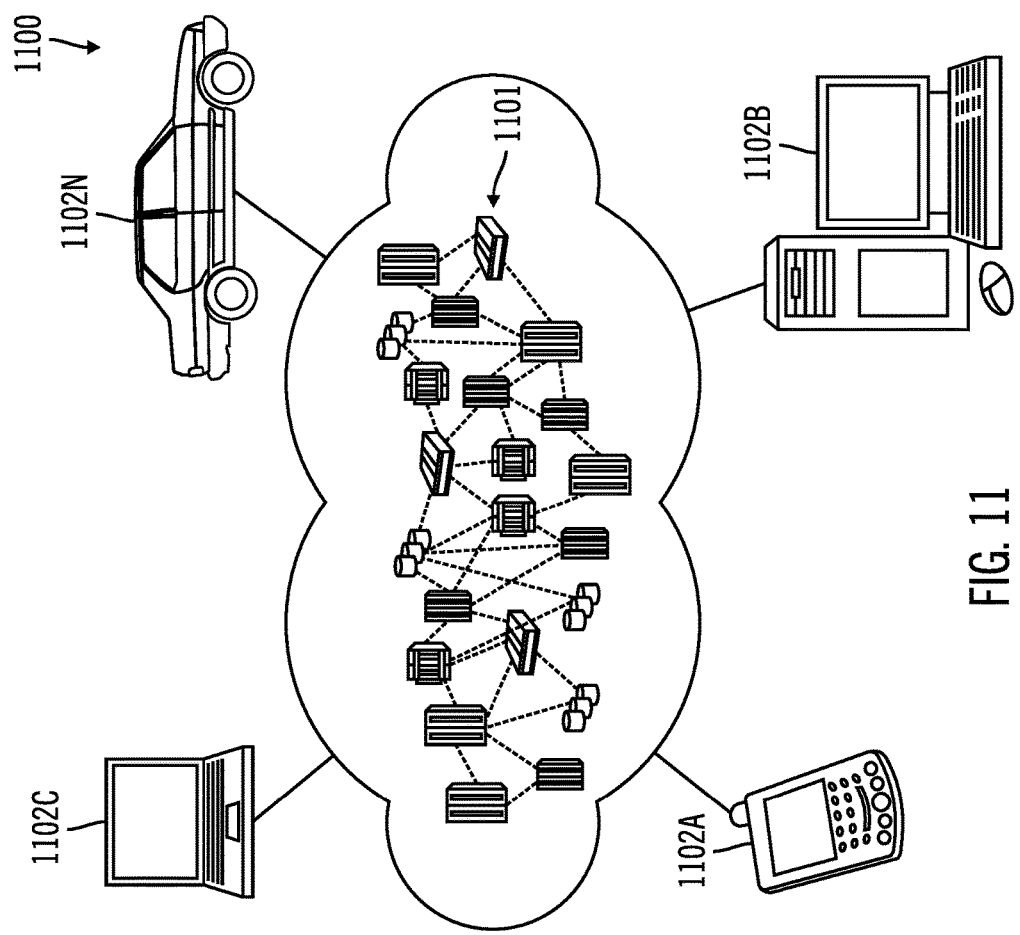
FIG. 11 depicts an embodiment of a cloud computing environment.

Referring now to FIG. 11, illustrative cloud computing environment 1100 is depicted. As shown, cloud computing environment 1100 comprises one or more cloud computing nodes 1101 with which local computing devices used by cloud consumers, such as, for example, personal digital assistant (PDA) or cellular telephone 1102A, desktop computer 1102B, laptop computer 1102C, and/or automobile computer system 1102N may communicate. Nodes 1101 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1102A-N shown in FIG. 11 are intended to be illustrative only and that computing nodes 1101 and cloud computing environment 1100 can communicate with any type of computerized device over any type of network and/or network addressable connection (e.g., using a web browser).

Figure 12:
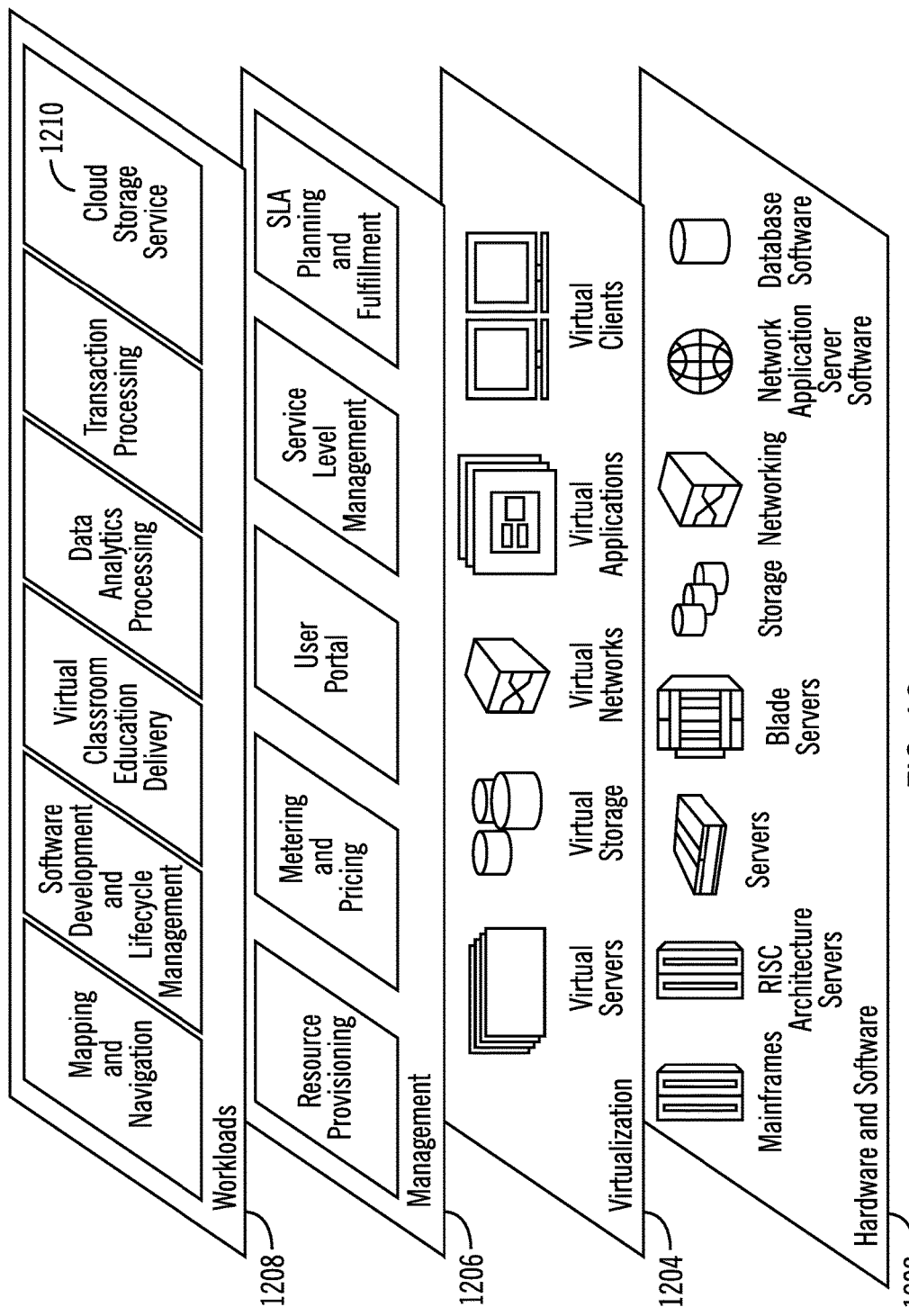
FIG. 12 depicts an embodiment of abstraction model layers of a cloud computing environment.

Referring now to FIG. 12, a set of functional abstraction layers provided by cloud computing environment 1000 (FIG. 10) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1202 includes hardware and software components. Examples of hardware components include: mainframes; RISC (Reduced Instruction Set Computer) architecture based servers; storage devices; networks and networking components. In some embodiments, software components include network application server software.

Virtualization layer 1204 provides an abstraction layer from which the following examples of virtual entities may be provided: virtual servers; virtual storage; virtual networks, including virtual private networks; virtual applications and operating systems; and virtual clients.

In one example, management layer 1206 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1208 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cloud based storage services 1210 as described above with respect to the cloud storage service 110 and cloud storage driver 122 described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as i, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product to store data objects used by multiple client systems in a network storage over a network, wherein the computer program product comprises a computer readable storage medium having computer readable program instructions executed by a processor to perform operations, the operations comprising:
    generating data objects associated with a logical entity at a client storage;
    determining a prefix for a container in the network storage associated with the logical entity;
    including the prefix in names of the data objects in the logical entity;
    adding the prefix to a lock queue shared by the client systems having access to the data objects in the container at the network storage; and
    transmitting the data objects having the names including the prefix to the network storage to store in the container in the network storage.

2. The computer program product of claim 1, wherein the logical entity comprises a backup object group to backup data at the client systems to the network storage.

3. The computer program product of claim 1, wherein the operations further comprise:
    sending a command to the network storage to determine whether the prefix is currently associated with a container of data objects at the network storage, wherein the prefix is included in the names of the data objects in response to determining that the prefix is not currently associated with a container at the network storage.

4. The computer program product of claim 1, wherein entries in the lock queue include a prefix and an access type of an access to a data object having a data object name including the prefix, wherein the operations further comprise:
    generating a lock request for a requested data object of the data objects in the container in the network storage, wherein the lock request indicates the prefix in the name of the data object to access and an access type;
    determining that the lock queue includes an entry having the prefix and the access type indicated in the lock request;
    determining whether to grant a lock to access the requested data object based on at least one of the access type indicated in the lock request and the access type indicted in the entry in the lock queue; and
    transmitting an access request for the access type in the lock request to the network storage to access the requested data object in the container in the network storage associated with the prefix in the lock request that was granted.

5. The computer program product of claim 4, wherein the operations further comprise:
    granting the lock in response to determining that the lock queue does not include an entry for the prefix indicated in the lock request;
    including an entry in the lock queue indicating the prefix and the access type for which the lock was granted; and
    in response to completing the access of the data object for which the lock was granted, removing the entry in the lock queue indicating the prefix and the access type for the access of the data object that completed.

6. The computer program product of claim 4, wherein the access type indicated in the lock request comprises a read access, wherein the lock for the read access is granted in response to determining that the lock queue does not include an entry indicating the prefix and a write access type, wherein the lock is not granted in response to determining that the lock queue includes an entry indicating the prefix in the lock request and the write access type, and wherein the lock is granted in response to determining that the lock queue includes only entries indicating the prefix of the lock request and a read access type.

7. The computer program product of claim 4, wherein the access type indicated in the lock request comprises a write access, wherein the lock is not granted in response to determining that there is one entry in the lock queue indicating the prefix of the lock request.

8. The computer program product of claim 4, wherein the access type indicated in the entry in the lock queue comprises a first access type for a first access request to a first data object including the prefix in a first name of the first data object, and wherein the requested data object comprises a second data object having a second name including the prefix and the access type in the lock request is for a second access type, wherein the lock request is granted based on the first access type indicated in the entry in the lock queue and the second access type indicted in the lock request.

9. The computer program product of claim 1, wherein the lock queue is located in at least one of a storage shared by the client systems external to the network storage and the container in the network storage associated with the prefix.

10. The computer program product of claim 1, wherein the prefix comprises a combination of a name of the container in the network storage in which a data object is stored and a name of one of a plurality of cloud storage service providers.

11. A system for storing store data objects used by multiple client systems in a network storage over a network, comprising:
   a processor; and
   a computer readable storage medium having computer readable program instructions executed by the processor to perform operations, the operations comprising:
      generating data objects associated with a logical entity at a client storage;
      determining a prefix for a container in the network storage associated with the logical entity;
      including the prefix in names of the data objects in the logical entity;
      adding the prefix to a lock queue shared by the client systems having access to the data objects in the container at the network storage; and
      transmitting the data objects having the names including the prefix to the network storage to store in the container in the network storage.

12. The system of claim 11, wherein the logical entity comprises a backup object group to backup data at the client systems to the network storage.

13. The system of claim 11, wherein entries in the lock queue include a prefix and an access type of an access to a data object having a data object name including the prefix, wherein the operations further comprise:
   generating a lock request for a requested data object of the data objects in the container in the network storage, wherein the lock request indicates the prefix in the name of the data object to access and an access type;
   determining that the lock queue includes an entry having the prefix and the access type indicated in the lock request;
   determining whether to grant a lock to access the requested data object based on at least one of the access type indicated in the lock request and the access type indicted in the entry in the lock queue; and
   transmitting an access request for the access type in the lock request to the network storage to access the requested data object in the container in the network storage associated with the prefix in the lock request that was granted.

14. The system of claim 13, wherein the operations further comprise:
   granting the lock in response to determining that the lock queue does not include an entry for the prefix indicated in the lock request;
   including an entry in the lock queue indicating the prefix and the access type for which the lock was granted; and
   in response to completing the access of the data object for which the lock was granted, removing the entry in the lock queue indicating the prefix and the access type for the access of the data object that completed.

15. The system of claim 13, wherein the access type indicated in the entry in the lock queue comprises a first access type for a first access request to a first data object including the prefix in a first name of the first data object, and wherein the requested data object comprises a second data object having a second name including the prefix and the access type in the lock request is for a second access type, wherein the lock request is granted based on the first access type indicated in the entry in the lock queue and the second access type indicted in the lock request.

16. The system of claim 11, wherein the prefix comprises a combination of a name of the container in the network storage in which a data object is stored and a name of one of a plurality of cloud storage service providers.

17. A method implemented in a computer for storing data objects used by multiple client systems in a network storage over a network, comprising:
   generating data objects associated with a logical entity at a client storage;
   determining a prefix for a container in the network storage associated with the logical entity;
   including the prefix in names of the data objects in the logical entity;
   adding the prefix to a lock queue shared by the client systems having access to the data objects in the container at the network storage; and
   transmitting the data objects having the names including the prefix to the network storage to store in the container in the network storage.

18. The method of claim 17, wherein the logical entity comprises a backup object group to backup data at the client systems to the network storage.

19. The method of claim 17, wherein entries in the lock queue include a prefix and an access type of an access to a data object having a data object name including the prefix, further comprising:
   generating a lock request for a requested data object of the data objects in the container in the network storage, wherein the lock request indicates the prefix in the name of the data object to access and an access type;
   determining that the lock queue includes an entry having the prefix and the access type indicated in the lock request;
   determining whether to grant a lock to access the requested data object based on at least one of the access type indicated in the lock request and the access type indicted in the entry in the lock queue; and
   transmitting an access request for the access type in the lock request to the network storage to access the requested data object in the container in the network storage associated with the prefix in the lock request that was granted.

20. The method of claim 19, further comprising:
   granting the lock in response to determining that the lock queue does not include an entry for the prefix indicated in the lock request;
   including an entry in the lock queue indicating the prefix and the access type for which the lock was granted; and
   in response to completing the access of the data object for which the lock was granted, removing the entry in the lock queue indicating the prefix and the access type for the access of the data object that completed.

21. The method of claim 19, wherein the access type indicated in the entry in the lock queue comprises a first access type for a first access request to a first data object including the prefix in a first name of the first data object, and wherein the requested data object comprises a second data object having a second name including the prefix and the access type in the lock request is for a second access type, wherein the lock request is granted based on the first access type indicated in the entry in the lock queue and the second access type indicted in the lock request.

22. The method of claim 17, wherein the prefix comprises a combination of a name of the container in the network storage in which a data object is stored and a name of one of a plurality of cloud storage service providers.

\* \* \* \* \*